United States Patent
Namou et al.

(10) Patent No.: US 10,124,686 B2
(45) Date of Patent: Nov. 13, 2018

(54) DUAL INDUCTIVE/CONDUCTIVE DC-COUPLED CHARGING SYSTEM

(71) Applicant: GM GLOBAL TECHNOLOGY OPERATIONS LLC, Detroit, MI (US)

(72) Inventors: Andrew J. Namou, West Bloomfield, MI (US); Russell K. Steele, Clinton Township, MI (US); Douglas S. Cesiel, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 192 days.

(21) Appl. No.: 15/211,659

(22) Filed: Jul. 15, 2016

(65) Prior Publication Data
US 2018/0015833 A1 Jan. 18, 2018

(51) Int. Cl.
*H02J 7/00* (2006.01)
*B60L 11/18* (2006.01)

(52) U.S. Cl.
CPC .......... *B60L 11/182* (2013.01); *B60L 11/185* (2013.01); *B60L 11/1811* (2013.01); *B60L 11/1816* (2013.01); *B60L 11/1833* (2013.01); *B60L 11/1835* (2013.01); *B60L 11/1864* (2013.01); *H02J 7/00* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 5,541,490 A | * | 7/1996 | Sengupta | G01R 31/3624 320/160 |
| 2008/0028237 A1 | * | 1/2008 | Knight | H04L 12/66 713/300 |
| 2011/0238260 A1 | * | 9/2011 | Kotani | G06F 21/31 701/31.4 |
| 2012/0217928 A1 | * | 8/2012 | Kulidjian | B60L 3/0069 320/109 |
| 2015/0303704 A1 | * | 10/2015 | Juan | H02J 5/005 320/108 |

* cited by examiner

*Primary Examiner* — Samuel Berhanu
(74) *Attorney, Agent, or Firm* — Quinn IP Law

(57) ABSTRACT

An electrical system connectable to an offboard power supply includes a battery pack, parallel DC-coupled conductive and inductive charging systems, and a controller. The controller initiates charging of the battery pack using analog low-voltage signals. A charging preference may prioritize charging via a designated one of the charging systems. Another electrical system includes a battery pack connected to a DC voltage bus, a charge coupler connectable to the offboard power supply to establish a plug-in charging connection, parallel DC-coupled conductive and inductive charging systems, and a controller. The controller commands charging using the analog low-voltage control signals, doing so via the conductive charging system when the charge coupler is plugged into the power supply and via the wireless charger when the charge coupler is not plugged into the power supply and the controller detects proximity of the system to the primary induction coil.

14 Claims, 6 Drawing Sheets

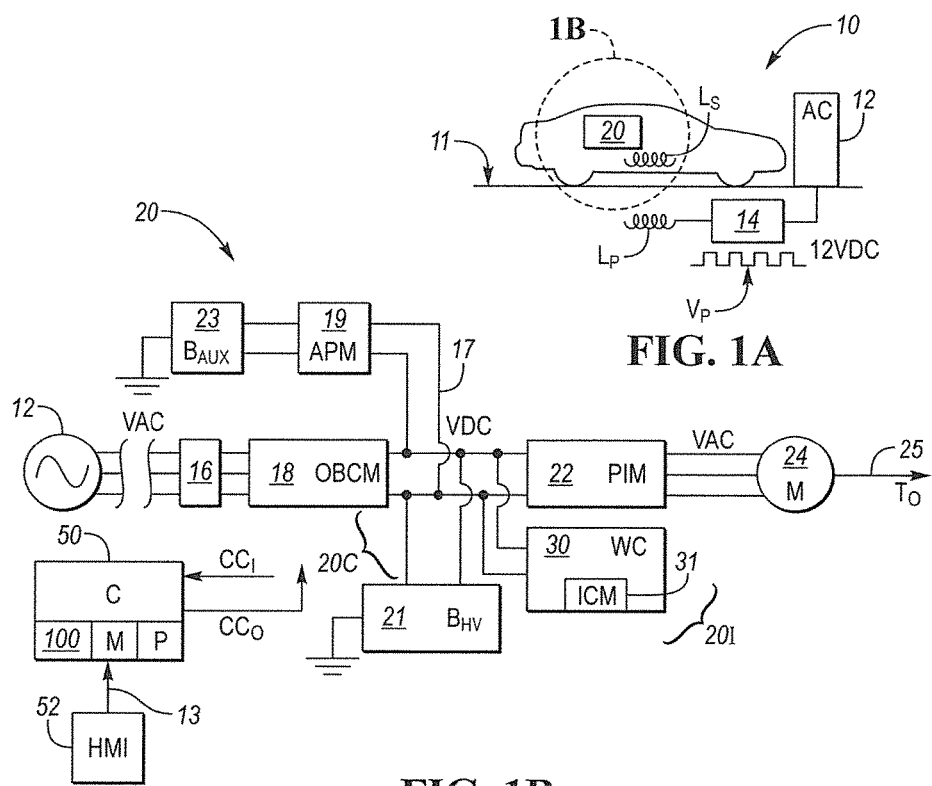
FIG. 1A
FIG. 1B
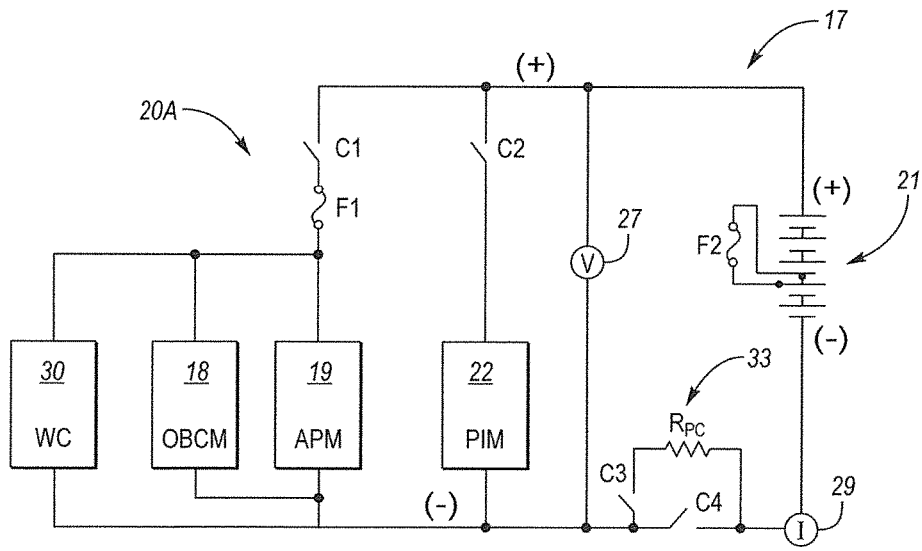
FIG. 2

DUAL INDUCTIVE/CONDUCTIVE DC-COUPLED CHARGING SYSTEM

TECHNICAL FIELD

The present disclosure relates to a dual inductive/conductive DC-coupled charging system.

BACKGROUND

An electrified powertrain typically includes one or more high-voltage alternating current (AC) electric machines, each of which is powered by a high-voltage direct current (DC) battery pack. A power inverter module receives a DC voltage from the battery pack and generates an AC output voltage suitable for powering the electric machines. Conductive charging of the various cells of the battery pack may be achieved by connecting an onboard charge coupler to an offboard power supply, such as an available wall outlet, AC charging station, or DC fast-charging station, e.g., electric vehicle supply equipment (EVSE).

Onboard a vehicle having the type of electrified powertrain noted above, an AC-DC converter may be used as a battery charger or onboard charging module (OBCM) to convert an AC charging voltage from an offboard AC power supply into a DC voltage suitable for use by the DC battery pack and other DC devices. The OBCM may include a passive diode bridge and actively-controlled semiconductor switches which collectively eliminate negative cycles of the applied AC charging voltage waveform. The resultant voltage output is then filtered to provide a suitable DC voltage to a DC voltage bus.

Charging of the high-voltage battery pack may be achieved in other ways. For instance, wireless charging is an emerging alternative charging process in which relatively high-frequency AC power is delivered to a primary induction coil positioned in close proximity to a vehicle-side wireless charger having a secondary induction coil. An operator of an electric vehicle, for instance, parks the vehicle above an infrastructure-side induction system, which typically contains the primary induction coil and associated power conversion and voltage rectification hardware. The AC current delivered to the primary induction coil induces an AC current in the vehicle-side secondary induction coil. The induced AC current is then converted to DC current using hardware of the type described above.

SUMMARY

A dual inductive/conductive, DC-coupled charging system is disclosed herein for use with an electrified system. The electrified system may be embodied as a hybrid electric vehicle, battery electric vehicle, or any other plug-in vehicle or other mobile platform. The present solution is characterized by an absence of control of the DC-coupled charging system via controller area network (CAN) bus messaging, unlike conventional AC-coupled, CAN-controlled wireless systems. Instead, separate inductive and conductive charging systems are arranged in electrical parallel with each other. In lieu of CAN messaging, low-voltage analog control signals provide all essential control functions as set forth herein.

Also disclosed is a control methodology which, in a particular embodiment, allows for automatic, user-directed or prioritized switching between the available inductive and conductive charging systems, as well as proper sequencing of charge initiation and termination, thereby maintaining existing vehicle charging features and architecture.

In particular, a vehicle or other electrified system is disclosed herein that is connectable to an offboard power supply, typically an AC charging station. The vehicle includes an electric machine driven via energy from a DC battery pack, a conductive charging system operable for conductively charging the battery pack via the offboard power supply, a wireless charging system operable for inductively charging the battery pack via the offboard power supply, and a controller. The controller may be programmed in some embodiments to receive a charging preference and selectively initiate charging of the battery pack according to the received charging preference, doing so using analog low-voltage control signals. The charging preference prioritizes charging of the battery pack via a designated one of the conductive and wireless charging systems, with the possibility of simultaneous conductive and wireless charging. In other embodiments, charging may automatically default to conductive charging when the vehicle is plugged into the power supply.

Another electrical system includes a DC voltage bus, a battery pack connected to the DC voltage bus, a charge coupler connectable to the offboard power supply to establish a plug-in charging connection, and parallel DC-coupled conductive and inductive charging systems. The system in this embodiment includes a controller programmed to selectively initiate charging of the battery pack using analog low-voltage control signals. The controller is programmed to charge the battery pack via the DC-coupled conductive charging system when the charge coupler is plugged into the offboard power supply, and via the wireless charger when the charge coupler is not plugged into the offboard power supply and the controller detects the proximity of the system to the primary induction coil.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1A is a schematic illustration of an example electrified system in the form of a plug-in electric vehicle having dual DC-coupled conductive and inductive charging systems and a controller programmed to charge a high-voltage battery pack using either/both of the DC-coupled charging systems.

FIG. 1B is a schematic circuit diagram for the DC-coupled charging system usable as part of the vehicle shown in FIG. 1A.

FIG. 2 is a schematic circuit diagram illustrating an example implementation of the conductive and inductive charging system usable aboard the example vehicle of FIG. 1A.

DETAILED DESCRIPTION

Figure 3:
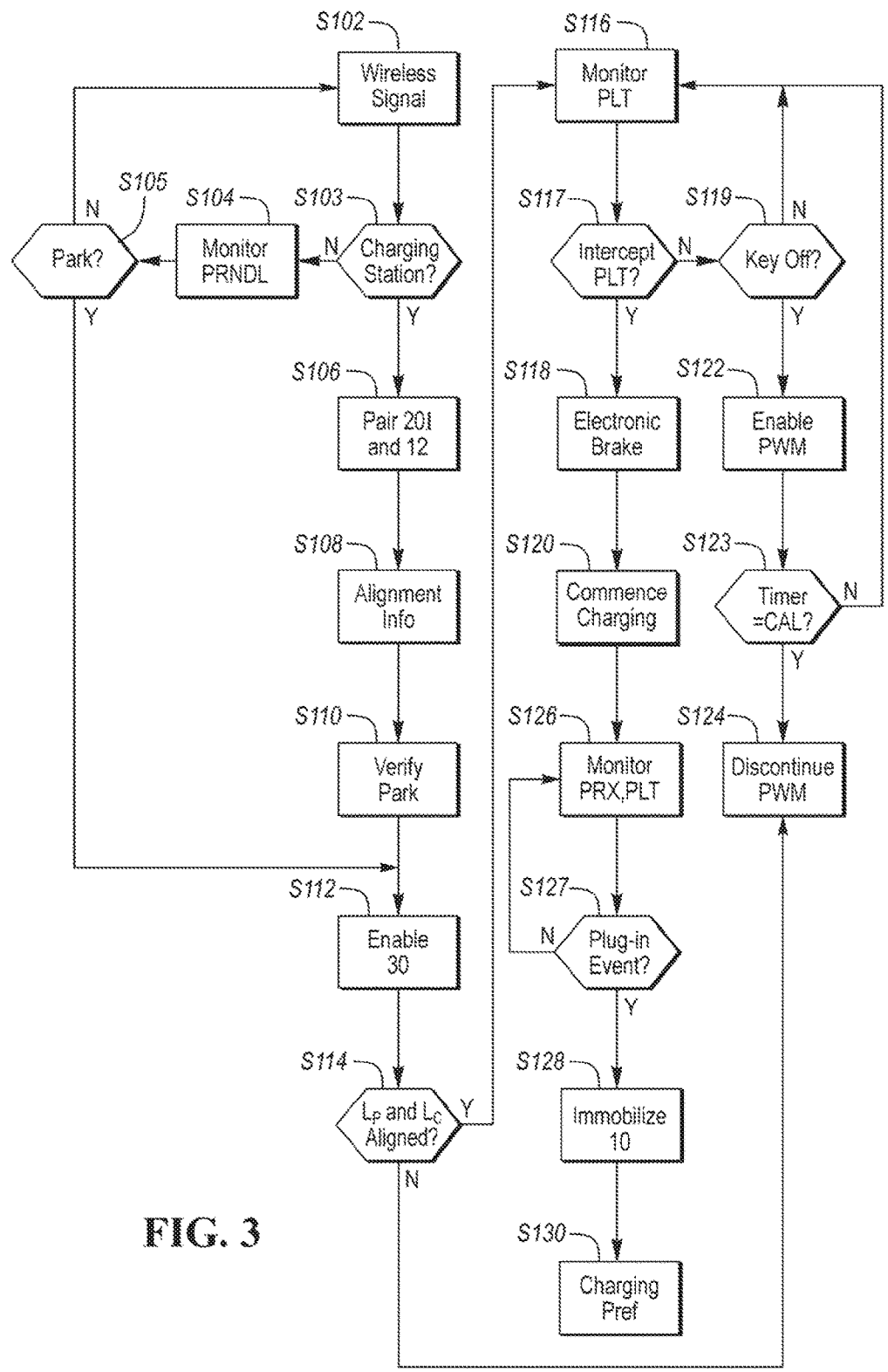
FIG. 3 is a schematic flow chart describing a method for initiating a wireless charging the battery pack of the vehicle of FIG. 1.

Referring to the drawings, wherein like reference numbers refer to the same or like components in the several Figures, an example electrified system in the form of a plug-in vehicle 10 and electrical system 20 are shown schematically in FIGS. 1A and 1B, respectively. The electrical system 20 has dual inductive and conductive, DC-coupled charging systems 20I and 20C arranged in electrical parallel with each other. Additionally, the present solution is characterized by an absence of controller area network (CAN) bus communications in the overall control of the charging operation. In lieu of CAN messaging of the type typically used to control conventional aftermarket AC-coupled wireless charging modules, all necessary control communications occur via low-voltage analog control signals as set forth herein.

Although the vehicle 10 is depicted as a passenger vehicle, the vehicle 10 may be alternatively embodied as any electrified mobile system, e.g., any hybrid electric or battery electric vehicle, a robot, or any mobile platform. An operator of the vehicle 10 may charge a high-voltage (HV) battery pack ($B_{HV}$) 21 using a wireless inductive and/or a hardwired conductive charging process. To prioritize a given charging option, the operator in some embodiments may input a charging preference (arrow 13) to a charging controller (C) 50 via a human machine interface (HMI) device 52. Other embodiments forego use of the charging preference (arrow 13) to instead automatically default to conductive charging whenever the vehicle is plugged into the offboard power supply.

The HV battery pack 21, e.g., a multi-cell lithium ion, zinc-air, nickel-metal hydride, or lead acid DC battery pack, can be selectively recharged using an offboard power supply 12 when the vehicle 10 is stopped, i.e., parked and not moving. The offboard power supply 12 may be embodied as electric vehicle supply equipment (EVSE) of the type known in the art, or any other suitable source of offboard plug-in power. The HV battery pack 21 may also be recharged during ongoing operation of the vehicle 10, for instance via regenerative braking. The electric potential of the HV battery pack 21 may range from about 60-360 VDC or more depending on the configuration of the vehicle 10. However, for the purposes of the present disclosure the term "high-voltage" refers to any voltage level in excess of typical 12-15 VDC auxiliary voltage levels. Energy from the HV battery pack 21 may be used to energize one or more electric machines (M) 24 via a power inverter module (PIM) 22, such that the electric machine 24 ultimately produces an output torque (arrow $T_O$) via an output member 25 to propel the vehicle 10 or perform other work.

Auxiliary power aboard the vehicle 10 is supplied in part via an auxiliary battery ($B_{AUX}$) 23. The auxiliary battery 23 may be energized via an auxiliary power module (APM) 19, i.e., a voltage regulator operable for reducing the DC voltage from a level output from the HV battery pack 21 to a lower auxiliary level suitable for powering auxiliary electrical systems aboard the vehicle 10. The APM 19 and/or the auxiliary battery 23 may serve as auxiliary power supplies as needed within the scope of the present disclosure.

The conductive charging system 20C in particular may include a charge coupler 16 and an AC-DC converter, e.g., an onboard charging module (OBCM) 18 as shown schematically in FIG. 1. The OBCM 18 is electrically connected between the AC charge coupler 16 and the HV battery pack 21. As is well understood in the art, an AC-DC converter such as the OBCM 18 may include internal solid-state electronic components that work in concert to convert a voltage (VAC) from the offboard power supply 12 into a DC voltage output (VDC). Although omitted for illustrative simplicity, such internal structure typically includes electronic elements such as input and output waveform filters, passive diode bridges, semiconductor switches such as MOSFETs or IGBTs, a link capacitor, and a transformer. Of these components, the semiconductor switches have on/off switching states that can be commanded by the charging controller 50 or other control device to turn the OBCM 18 on or off as needed. Thus, the term "DC-coupled" used herein refers to connection of a given device to the DC-side of the electrical system 20.

Figure 4:
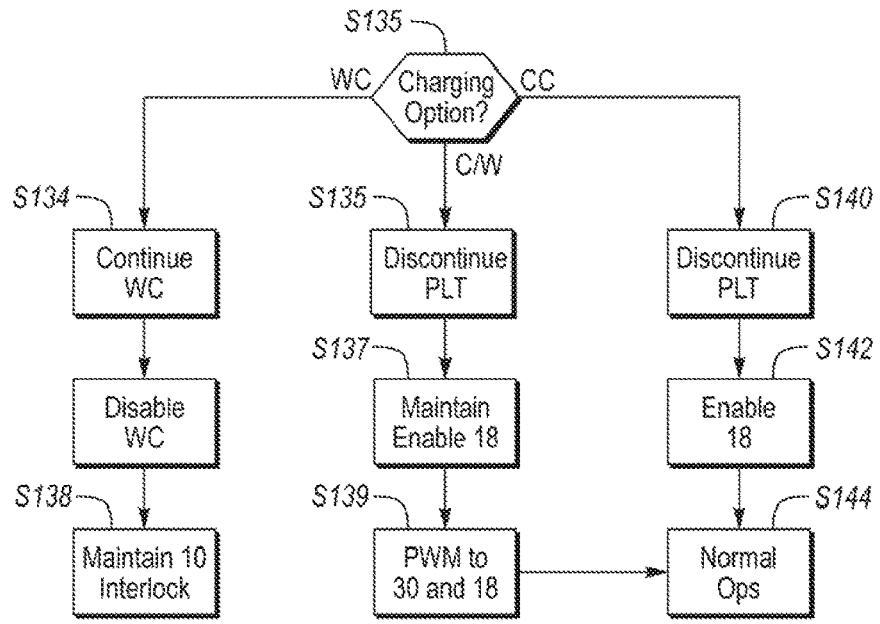
FIG. 4 is a schematic flow chart describing a method for processing different inductive and conductive charging decisions when a plug-in event is detected while wirelessly charging a battery pack.
Figure 5:
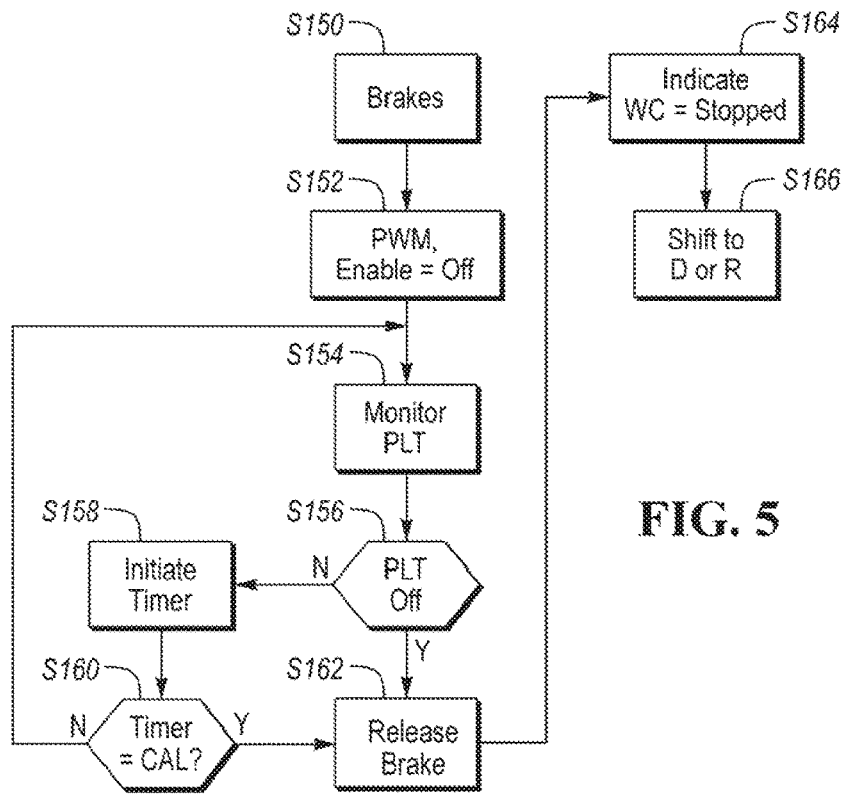
FIG. 5 is a schematic flow chart describing a method for ending the wireless charging event initiated in FIG. 3 and enabling drive operation of the vehicle shown in FIG. 1A.
Figure 9:
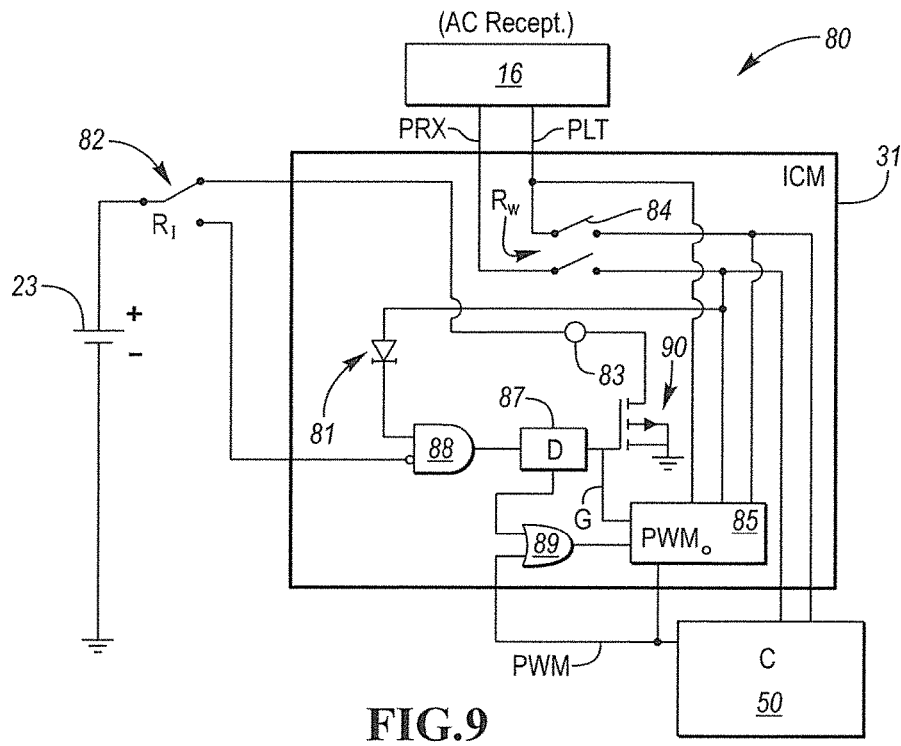
FIG. 9 is a schematic circuit diagram describing an alternative embodiment for initiating a wireless charging process in the vehicle of FIG. 1.
Figure 10:
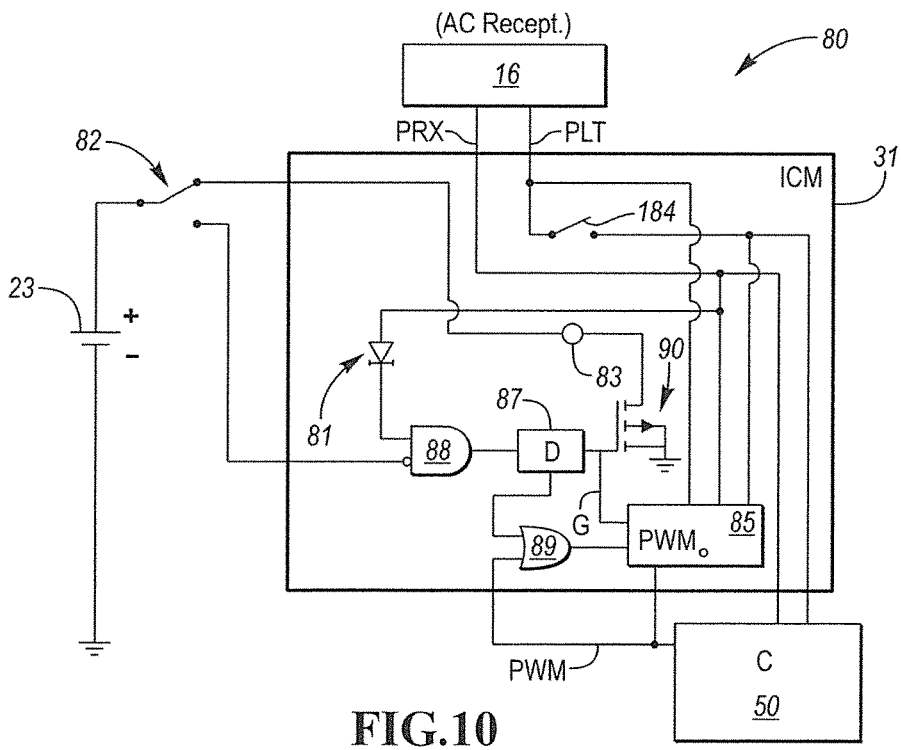
FIG. 10 is a schematic illustration of an alternative relay usable in the circuit shown in FIG. 9.

The controller 50 of FIG. 1A generates control signals (arrow $CC_O$) in response to input signals (arrow $CC_I$), with the various input signals ($CC_I$) described in further detail below with reference to FIGS. 6-8. In general, the controller 50 executes instructions embodying a method 100, an example embodiment of which is depicted in FIGS. 3-5, to determine the particular charging mode and thereafter control a charging operation in accordance with the charging preference (arrow 13). FIGS. 9-10 depict alternative embodiments in which charging defaults to conductive plug-in charging when the vehicle 10 is plugged into the offboard power supply 12.

The controller 50 includes a processor P and memory M. The memory M includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry. The HMI device 52 may be embodied as a touch screen such as a navigation screen or a touch screen of a cell phone or other portable device, and may be in wired or wireless communication with the controller 50.

The inductive charging system 20I shown in FIG. 1B includes a wireless charging module (WC), hereinafter referred to as a wireless charger 30. As with the conductive charging system 20C, the inductive charging system 20I is DC-coupled, i.e., connected to an HVDC bus 17. The wireless charger 30, which is connected in electrical parallel with the OBCM 18, includes an inductive control module (ICM) 31. As is known in the art, the ICM 31 may be embodied as a printed circuit board assembly that includes all necessary sensing and communication hardware and software necessary for interfacing with the controller 50 and the offboard power supply 12. The ICM 31 may include a radio frequency (RF) transceiver, and may be configured to utilize existing vehicle wireless communications, telematics, or wireless hot spots to provide the intended functionality. As shown in FIGS. 6-8 and explained below, the ICM 31 selectively receives a pass-through proximity signal (arrow PRX) and control pilot signal (arrow PLT), with the pilot signal (arrow PLT) being both an input and output to the ICM 31 and the proximity signal (arrow PRX) being an input for sensing the occurrence of a plug-in event as described below.

The wireless charger 30 includes a secondary coil ($L_S$) as shown schematically in FIG. 1A. On the infrastructure side of the electrical system 20, i.e., those portions of the wireless charging hardware located external to the vehicle 10, a primary coil ($L_P$) and an associated wireless charging circuit 14 are positioned with respect to the offboard power supply 12, e.g., embedded below or connected to a surface 11 of a garage floor or other designated charging location, such as part of a wireless charging pad. Power from the offboard power supply 12, typically 230 volt/50 Hz or 110 V/60 Hz, is converted via operation of the wireless charging circuit 14 into a relatively high-frequency signal, e.g., via pulse-width modulation, with the wireless charging circuit 14 providing any necessary power factor correction as is well known in the art.

With respect to the wireless charging circuit 14, which is inductively coupled to the wireless charger 30, a 12 VDC pulsed AC voltage signal ($V_P$) is output to the primary coil ($L_P$) at a low frequency, e.g., typically about 20-100 KHz. An AC current is induced in the secondary coil ($L_S$) when the vehicle 10 is parked in close proximity to the primary coil ($L_P$). The wireless charger 30 then rectifies and filters the induced AC current, with the resultant DC current as supplied to the HV bus 17 used to charge the HV battery pack 21 and/or power the APM 19 or other HV modules on the HV bus 17.

With respect to electric vehicle charging operations, industry standards specifically define how a given electric charging station is configured and operates, i.e., how the offboard power supply 12 connects to and communicates with the vehicle 10 during the entire charging process. For instance, SAE J1772, titled "SAE Surface Vehicle Recommended Practice J1772, SAE Electric Vehicle Conductive Charge Coupler", is currently such a standard in North America. Thus, an industry-common charging architecture is predefined, as are all functional and dimensional requirements for mating the connector/plug hardware constituting the charge coupler 16 and the offboard power supply 12.

Such a standard also requires electrical connection hardware located between the vehicle 10 and the offboard power supply 12 to include pins receiving the pilot signal (arrow PLT) and proximity signal (arrow PRX). The pilot signal (arrow PLT) identifies to the controller 50 and OBCM 18 a maximum available charging current from the offboard power supply 12, information that may be intercepted by the ICM 31 as detailed below. In addition to the functions associated with execution of the method 100 described below, the proximity signal (arrow PRX) is used by the controller 50 to accurately detect when the vehicle 10 has been plugged into the offboard power supply 12, i.e., a plug-in event, with this information ultimately used by the controller 50 to temporarily prevent or disable movement of the vehicle 10 for as long as the vehicle 10 remains electrically connected to the offboard power supply 12 via the charge coupler 16.

Referring to FIG. 2, an example embodiment of the electrical system 20 of FIG. 1B includes an electrical system 20A in which the OBCM 18, the APM 19, the PIM 22, and the wireless charger (WC) 30 share a common voltage bus rail, shown here as the negative (−) voltage rail of the HVDC bus 17. The wireless charger 30 is thus connected in electrical parallel with existing HV components on the HVDC bus 17.

A pre-charge circuit 33 is shared in common with the parallel HV components, i.e., the OBCM 18, the APM 19, the PIM 22, and the wireless controller 30. Of these parallel components, the wireless controller 30, APM 19, and OBCM 18 may share a single HV fuse F1 and contactor C1 or other suitable high-voltage switching device located on one voltage leg, with the PIM 22 arranged on a separate voltage leg and protected by a separate contactor C2 as shown. The pre-charge circuit 33 may include a pre-charge resistor ($R_{PC}$) and additional HV contactors C3 and C4, with the contactors C3 and C4 being opened and closed as needed to charge the negative rail (−) during the pre-charge process.

Other components may be placed in electrical parallel with the PIM 22 between the negative rail (−) and the contactor C2, e.g., a cabin heater control module and/or an air conditioning control module, with each device being protected by a separate HV fuse (not shown). The HV battery pack 21 may similarly be protected via another HV fuse F2 that, when open, effectively splits the HV battery pack 21. Other components such as a heater, heater fuse, and solid-state relay (not shown) may also be part of the electrical system 20A on a separate voltage leg between the positive rail (+) and the negative rail (−) of the HVDC bus 17.

A voltage sensor (V) 27 may be placed in electrical parallel with the HV battery pack 21. A DC voltage across the HV battery pack 21 may be measured by the voltage sensor (V) 27 and transmitted or otherwise reported to the controller 50 of FIG. 1 as part of the input signals (arrow $CC_I$) shown in FIG. 1B. Similarly, a current sensor (I) 29 may be positioned between the HV battery pack 21 and the shared pre-charge circuit 33. The current sensor 29 is operable for measuring a current flowing in the negative rail (−) as an additional part of the input signals (arrow $CC_I$).

Referring to FIG. 3 with additional reference to the structure of FIGS. 1A, 1B, 2, and 6-8, an embodiment of the method 100 noted briefly above begins with step S102, wherein the controller 50 searches via the ICM 31 or other hardware for a wireless charging signal emanating from the offboard power supply 12 and any wireless charging infrastructure connected thereto, e.g., an EVSE or charging station wireless transmitter. Step S102 may include receiving a wireless broadcast from the offboard power supply 12 or connected wireless infrastructure when the vehicle 10 is in proximity to a wireless charging pad having the wireless charging circuit 14 shown in FIG. 1A, with such a signal being indicative of the presence and availability of the wireless charging circuit 14. To limit power dissipation, wireless pairing can be limited to low-speed vehicle operation or advanced park-assist only.

The method 100 then determines at step S103 whether the values received at step S102 are indicative of an available wireless charging station, and proceeds to step S104 if wireless charging is not presently available. The method 100 proceeds in the alternative to step S106 when available wireless charging is detected.

Step S104 includes monitoring a park, reverse, neutral, drive, low (PRNDL) setting or state for a requested shift to park, whether park is selected by an operator of the vehicle 10 or autonomously. Step S104 may include detecting, as part of the input signals (arrow $CC_I$ of FIG. 1B), a position of PRNDL lever or a push-button signal in different embodiments. The method 100 then proceeds to step S105.

Step S105 includes determining via the information collected at step S104 whether a park mode has been commanded or selected, such as by comparing the values from step S104 to a calibrated state. The method 100 proceeds to step S112 when park has been selected or commanded. Step S102 is repeated when park has not yet been commanded or selected.

Step S106 includes pairing the wireless charging system 20I of the vehicle 10 of FIG. 1A with the offboard power supply 12. This step may be achieved using a suitable wireless communications protocol, e.g., similar to conventional pairing of a BLUETOOTH or other RF wireless device. The method 100 proceeds to step S108 once the vehicle 10 and the offboard power supply 12 are wirelessly paired.

Step S108 includes providing alignment instructions and/or feedback information to an operator of the vehicle 10, e.g., via the HMI device 52 of FIG. 1. Step S108 allows the operator to fine tune the positioning of the vehicle 10 with respect to the primary coil ($L_P$), e.g., via display of guidelines and/or camera feedback as typically used in conventional rear backup cameras and vehicle navigation systems. Step S108 is intended to help the operator guide the vehicle 10 into proper position with respect to a wireless charging pad having the primary coil ($L_P$) of FIG. 1A. Optionally, step S108 may entail signaling the operator not to touch a steering wheel, accelerator pedal, or brake pedal, with a separate controller (not shown) autonomously steering the vehicle 10 into proper final alignment. The method 100 then proceeds to step S110.

At step S110, the controller 50 verifies that a transmission (not shown) of the vehicle 10 has entered the park mode, e.g., by sensing or otherwise determining a corresponding park position of a PRNDL valve (not shown) using available onboard sensors. The method 100 then proceeds to step S112.

Step S112 includes commanding an enable signal, e.g., the PWM signal (arrow PWM of FIGS. 6-8) or a separate enable signal, to the wireless charger 30 of FIG. 1B as part of the output signals (arrow $CC_O$) from the controller 50. The PWM signal will have a identifying unique or predetermined duty cycle such that the wireless charger 30 can differentiate from an actual current request command. That is, an enable signal is transmitted to semiconductor switches (not shown) of the wireless charger 30. This in turns enables or "wakes up" the power conversion function of the wireless charger 30, which up until step S112 has been in dormant or off state to reduce energy consumption. The method 100 then proceeds to step S114.

At step S114, the controller 50 of FIG. 1B determines whether the wireless charging system 20I remains properly aligned with the available charging infrastructure, i.e., the primary and secondary coils ($L_P$ and $L_C$) are properly aligned and the controller 50 is in communication with the wireless charging circuit 14 of the infrastructure-side of the electrical system 20. If properly aligned, the method 100 proceeds to step S116. The method 100 proceeds instead to step S124 if such alignment is not verified.

Step S116 includes monitoring for the presence of the pilot signal (arrow PLT) via the controller 50. As noted above and as is well known in the art, the pilot signal (arrow PLT) informs the controller 50 and, in certain circumstances set forth herein, the wireless charger 30 as to the available charging amperage. The method 100 proceeds to step S117 while such monitoring is ongoing.

Step S117 includes determining if the pilot signal (arrow PLT) intercepted by the wireless charger 30 is present and received by the controller 50. That is, the wireless charger 30 intercepts the pilot signal (arrow PLT), via the ICM 31 or RF antenna structure connected thereto, when in wireless communication with the offboard power supply 12 and wireless charging circuit 14. The intercepted pilot signal (arrow PLT) may be passed through to the controller 50, subject to Live Object Detection (LOD) and Foreign Object Detection (FOD) as is known in the art. The method 100 proceeds to step S118 if the pilot signal (arrow PLT) is received by the controller 50. Otherwise, the method 100 proceeds to step S119.

Step S118 includes optionally setting an electronic parking brake via the controller 50, for instance via transmission of an electronic control signal to a mechanical interlock device (not shown), to ensure that the vehicle 10 is mechanically locked into the park mode. The method 100 then proceeds to step S120.

Step S119 includes determining if an ignition or key-on/off state of the vehicle 10 is presently off. The method 100 repeats step S116 if the controller 50 determines the vehicle 10 is in a key-on state and to step S122 when a key-off state is detected.

At step S120, the controller 50 uses the control PWM signal (arrow PWM of FIGS. 6-8) to commence wireless charging of the HV battery pack 21 of FIG. 1B via operation of the inductive charging system 20I, i.e., via generation by induction of an AC current in the secondary coil ($L_S$) of FIG. 1A. As is well known in the art, the control PWM (arrow PWM of FIGS. 6-8) utilizes a calibrated duty cycle to control the wireless charging rate.

At step S122, upon detecting a key-off event in which the vehicle 10 is turned off, the controller 50 starts a timer, detects via the wireless charger 30 whether the vehicle 10 is parked in proximity to the offboard power supply, or more specifically to the primary coil ($L_P$) and the wireless charging circuit 14 of FIG. 1A. More specifically, step S122 entails looking for a pilot signal (PLT) that the wireless charger 30 can emulate or mimic, with step S122 providing, in essence, a timed PWM command/enable function. The method 100 then proceeds to step S123.

Step S123 includes monitoring a value of the timer against a calibrated limit. Step S116 is repeated if the presence of the wireless charging circuit 14 is detected, i.e., the pilot signal (PLT) is sensed, before the calibrated duration has elapsed. The method 100 proceeds to step S124 when the calibrated duration elapses without detection of the pilot signal (PLT) indicative of the presence of the charging circuit 14.

Step S124 includes discontinuing PWM control of the wireless charger 30 and, after a calibrated duration, allowing the vehicle 10 to shut down.

At step S126, during wireless charging the proximity signal (arrow PRX) and pilot signals (arrow PLT) from the charge coupler 16 are monitored by the controller 50. Step S126 includes receiving and processing the respective proximity and pilot signals (arrows PRX, PLT) via the controller 50 and the wireless charger 30 or converter box 70 (FIG. 7), determining the presence and values of each, and then proceeding to step S127.

At step S127, the controller 50 and the wireless charger 30 or optional converter box 70 next determine whether a plug-in event has been detected using the received proximity signal (arrow PRX). As is known in the art of electrical vehicle charging, an output drive circuit (not shown) provides a reference voltage usually 4.5-5 VDC, in the vehicle 10, e.g., as part of the charge coupler 16. A plug connecting the offboard power supply 12 to the charge coupler 16 has a resistor divider network, defined by J1772 in North America and is connected to neutral or ground. The reference voltage is thus available to the wireless module 30. When the charge coupler 16 of FIG. 1B is plugged into the offboard power supply 12, the output drive circuit aboard the vehicle 10 is loaded via parallel resistors such that the reference voltage drops to a lower reference voltage, e.g., 2.5 VDC. In this manner, plugging in of the vehicle 10 to initiate a conductive charging process is readily detected by the vehicle 10 as a plug-in event.

The method 100 repeats step S126 when the plug-in event described above is not detected at step S127. The method 100 proceeds to step S128 in the alternative when the plug-in event is detected.

Step S127 includes temporarily immobilizing the vehicle 10, for instance by locking out a PRNDL shifter (not shown) via brake transmission shift interlock or BTSI when the PRNDL state is a park state so as to prevent the manual shifting of a transmission of the vehicle 10 out of park. The method 100 then proceeds to step S130.

Step S130 may include processing the charging preference (arrow 13 of FIG. 1B) from the HMI device 52 via the controller 50 so as to determine an operator's inductive/conductive charging preference. In such an embodiment, the controller 50 and/or the HMI device 52 may be programmed to display a plurality of charging preferences, and for receiving an input that corresponds to a selected one of the displayed plurality of charging preferences. For instance, an operator may touch an icon labeled "conductive/plug-in charging", "inductive/wireless charging", or "inductive and wireless charging", and thereby generate the charging preference (arrow 13). In other embodiments, the charging preference (arrow 13) may be preprogrammed as a default charging preference, for instance by always requiring wireless charging when such charging is available. FIGS. 9 and 10 present two examples of possible default options. The method 100 then proceeds to step S132, which will now be described with reference to FIG. 4.

FIG. 4 depicts another portion of the method 100 that specifically handles different operator charging preferences (arrow 13 of FIG. 1B) when the controller 50 detects a plug-in event while wirelessly charging the HV battery pack 21. As noted above, the controller 50 may be programmed to determine an operator charging preference (arrow 13) either alone or as part of the input signals (arrow $CC_I$). The HMI device 52 may display a list of charging preference options, including conductive charging, inductive charging, and a combination of conductive and inductive charging. Step S132 thus includes determining which charging option the operator has selected. If no charging option is selected, the controller 50 may be programmed to execute a default charging priority. The method 100 proceeds to step S134 if a wireless charging preference (option WC) is selected, to step S135 if a combined conductive and wireless (C/W) charging preference is selected, and to step S140 if a conductive charging preference (CC) is selected.

Step S134 includes continuing the process of wireless charging via the wireless charger 30, i.e., the controller 50 does not enable conductive charging via the OBCM 18. The OBCM 18 may be used, however, to report the DC voltage to the controller 50. The method 100 then proceeds to step S136.

Step S136 includes determining when wireless charging is complete, either relative to a state of charge of the HV battery pack 21 or upon completion of a timed charging interval, e.g., a scheduled charging duration. When wireless charging is complete, the controller 50 may send out calibrated PWM signals, i.e., at a predetermined duty cycle, to the wireless charger 30 to disable the current command to the wireless charger 30. The method 100 then proceeds to step S138.

At step S138, the controller 50 maintains mechanical interlock or other immobilization of the vehicle 10. As is known in the art, a vehicle such as the vehicle 10 of FIG. 1A is prevented from moving while the vehicle 10 remains plugged into the offboard power supply 12. In order to exit step S138, an operator of the vehicle 10 must first unplug a charging cable (not shown) from the charge coupler 16, which in turn triggers the release of BTSI or other immobilization technique. The vehicle 10 is then able to be shifted into drive or reverse.

Step S135 includes discontinuing transmission of the pilot signal (arrow PLT) from the wireless charger 30 so that the plug-in event is made known to the OBCM 18 and the controller 50. As explained above, when wirelessly charging, the wireless charger 30 transmits the pilot signal (PLT), while during conductive plug-in charging the same function is performed by the charge coupler 16. The method 100 then proceeds to step S137.

At step S137, the controller 50 maintains an enable signal (arrow E of FIGS. 6-8) to the OBCM 18 and proceeds to step S139.

Step S139 includes transmitting PWM control signals (arrow PWM) to the wireless charger 30 and the OBCM 18 based on the expectation that additional charging current is available, i.e., a plug-in current via the conductive charging system 20C and a wireless charging current via the inductive charging system 20I. The method 100 then proceeds to step S144.

Step S140 includes discontinuing transmission of the pilot signal (arrow PLT) from the wireless charger 30 so that the plug-in event is made known to the OBCM 18 and the controller 50. The control PWM signal is set, e.g., via a particular duty cycle, so that the inductive charging system 20I discontinues the wireless charging process. The method 100 then proceeds to step S142.

At step S142, the controller 50 transmits the enable signal (arrow E) to the OBCM 18. Once the OBCM 18 is enabled, conductive charging commences via the conductive charging system 20C. Conductive charging thereafter continues in the conventional manner. The method 100 then proceeds to step S144.

At step S144, the controller 50 returns to normal operation when conductive charging is complete.

Referring to FIG. 5, the method 100 continues when an operator in the process of wirelessly charging the vehicle 10 of FIG. 1 decides to prematurely end the wireless charging process and drive away. As normal plug-in verification controls are not enabled or available during wireless charging events, the controller 50 is specially programmed to handle this situation.

Figure 6:
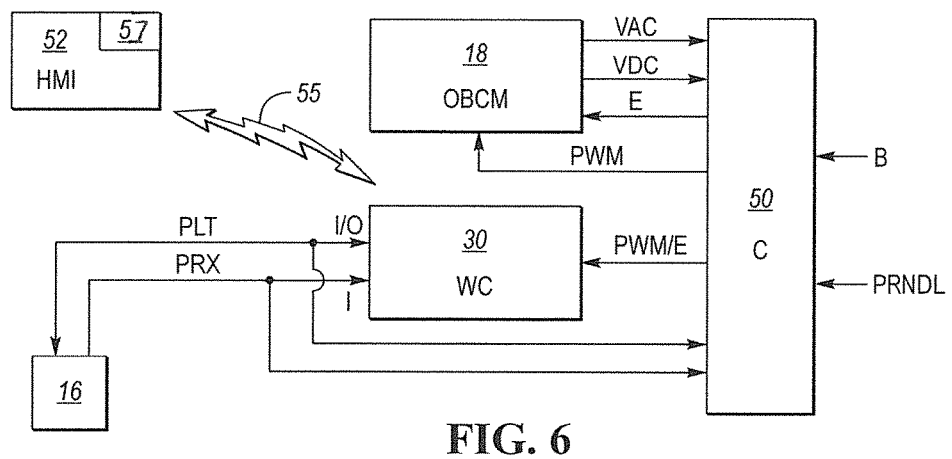
FIGS. 6-8 are schematic circuit diagrams describing alternative hardware embodiments for implementing the above-described methodology.
Figure 7:
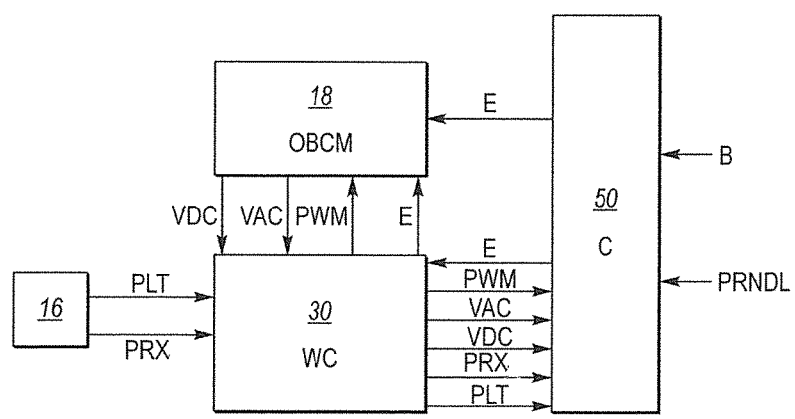
Figure 8:
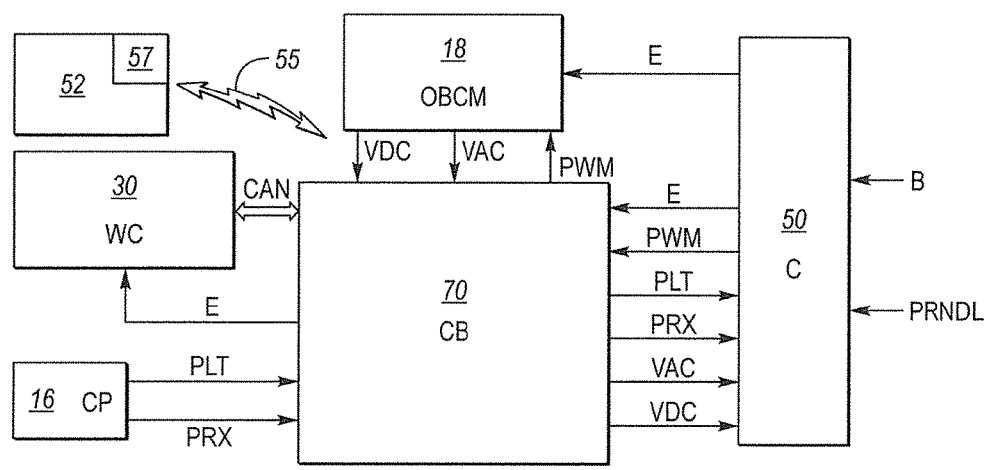

Specifically, at step S150 the controller 50 of FIG. 1B detects application of brakes of the vehicle 10, e.g., via a brake signal and an attempt to shift a PRNDL lever or push-button device into a drive or reverse gear state, as respectively indicated by arrows B and PRNDL in FIGS. 6-8. Other possible conditions of step S150 may include the detection of an RF key fob signal, a telematics signal, or a remote signal activated via an application (app) on a handheld device such as a cell phone. The method 100 then proceeds to step S152.

At step S152, the controller 50 sets the PWM control signals (arrow PWM) and an enable signal (arrow E) to the wireless charger 30 to an off state and proceeds to step S154.

At step S154, the controller 50 monitors the state of the pilot signal (arrow PLT) and proceeds to step S156.

Step S156 includes determining if the state of the pilot signal (arrow PLT) is off or disabled. If so, the method 100 proceeds to step S162. The method 100 proceeds instead to step S158 if the pilot signal (arrow PLT) is still active.

Step S158 may include initiating a timer to provide time for the wireless charging event to end and proceeding to step S160, wherein the controller 50 compares the timer value to a calibrated timer limit. Step S154, S156, S158, and S160 are repeated in a calibrated loop until the calibrated timer limit has been reached. At this point, the method 100 proceeds to step S162.

Step S162 includes commanding release of a parking brake or otherwise removing software or hardware-based immobilization of the vehicle 10. The method 100 then proceeds to step S164.

At step S164, the controller 50 may transmit a signal to the HMI device 52 of FIG. 1 to provide an indication to the operator that wireless charging has stopped. At step S166, the operator is free to shift the PRNDL into drive or reverse and drive away from the offboard power supply 12.

FIGS. 6-8 depict alternative hardware embodiments suitable for implementing the above-described method 100. Beginning with FIG. 6, the OBCM 18 is electrically connectable to the offboard power supply 12 of FIG. 1 to allow conductive charging in the usual manner, i.e., via the conductive charging system 20C of FIG. 1B. The controller 50 is in low-voltage analog communication with the charge coupler 16, the OBCM 18, and the wireless charger 30. Additionally, the wireless charger 30 is in communication with the HMI device 52 over a wireless pathway 55, e.g., WIFI or BLUETOOTH, and possibly with a telematics unit 53 of the type known in the art. The wireless charger 30 receives information including alignment and operating status information over the wireless pathway 55.

The wireless charger 30 includes an I/O port and an input (I) port, labeled for instance in FIG. 6. From the charge coupler 16, the I/O port receives the pilot signals (arrow PLT) as explained above informing the wireless charger 30 as to the available amperage. Similarly, the input port (I) receives the proximity signal (arrow PRX) to indicate whether or not the charge coupler 16 has been plugged into the offboard power supply 12, with a high reference voltage of, e.g., 4.5-5 VDC indicating that a plug-in event has not occurred, as explained separately above.

The controller 50 receives the AC input voltage (arrow VAC) and DC output voltage (arrow VDC) to/from the OBCM 18 and selectively provides or, in embodiments of FIGS. 7 and 8 for instance, commands a control PWM signal (arrow PWM) to the wireless charger 30 and/or the OBCM 18 (FIG. 6) when the vehicle 10 is first shifted into park. Based on the operator's charging preference (arrow 13 of FIG. 1B), the controller 50 may enable, via enable signal (arrow E), operation of one or both of the OBCM 18 and the wireless charger 30. When the charge coupler 16 is not plugged into the offboard power supply 12, the controller 50 will default to wireless charging. If the control pilot (arrow PLT) is not received by the wireless charger 30 within a calibrated duration after the vehicle 10 is shifted into park, the controller 50 can turn off the wireless charger 30 via the control PWM/enable signal (arrow PWM/E) and then shut off the vehicle 10. Thus, the analog control PWM/enable signal (arrow PWM/E) can serve as a "wake up" signal to wake up or enable the wireless charger 30 when the vehicle 10 enters a park state.

FIGS. 7 and 8 illustrate alternative embodiments to that of FIG. 6. In FIG. 7, the OBCM 18 receives the enable signal (arrow E) directly from the controller 50 and communicates the DC output voltage (VDC) and AC input voltage (VAC) to the wireless charger 30. The controller 50 transmits the enable signal (arrow E) to the wireless charger 30, with the enable signal (arrow E) generated by the controller 50 when the vehicle 10 is shifted into park. The control PWM signal (arrow PWM) is transmitted by the controller 50 to the wireless charger 30. The proximity signal (arrow PRX) and the pilot signal (arrow PLT) are passed through the wireless charger 30 to the controller 50. The wireless charger 30 in FIG. 7 thus receives charging signals from the charge coupler 16 and the OBCM 18 and ports them to the controller 50 as needed.

FIG. 8 depicts an embodiment that may be particularly useful in aftermarket applications. The functions of FIGS. 6 and 7 may be offloaded to a converter box (CB) 70 which serves as an interface module between the wireless charger 30 and charge coupler 16 on one side, and the controller 50 and OBCM 18 on the other. As existing vehicles typically use CAN messaging with a wireless charger, existing CAN communications from the wireless charger 30 may be fed into the converter box 70, with the converter box 70 transmitting an analog enable signal (arrow E) to the wireless charger 30 when needed to commence wireless charging. All communications and control signals continue to be low-voltage analog signals fed to the converter box 70 by the controller 50. As such, a plug-and-play converter box may be electrically connected between an existing wireless charger 30 and the controller 50 to route the signals to their required destinations without modifying hardware of any existing OBCM 18 or wireless charger 30.

The electrical system 20 and the method 100 thus use existing signals from a conductive charging system 20C to add wireless charging functionality, thus enabling wireless charging with minimum added hardware complexity. The approach is further simplified via control by analog, low-voltage signals, which eliminates the need for a manufacturer of the vehicle 10 to provide a manufacturer of an after-market system with detailed CAN database knowledge. An operator is afforded the opportunity of stating a priority for wireless, conductive, or both wireless and conductive charging processes when both types of charging processes are available.

FIG. 9 depicts an alternative control circuit 80 for passively initiating a DC-coupled wireless charging process in the vehicle 10 of FIG. 1. The control circuit 80, which is intended to facilitate more of a non-intrusive after-market integration method with the vehicle 10, functions by mimicking or emulating a conductive charging connection using the ICM 31, or alternatively via the converter box 70 of FIGS. 7 and 8. As explained in detail above, a typical plug-in charging operation initiates when the charge coupler 16 is physically plugged into an offboard power supply. This results in communication of the proximity signal (PRX) and the pilot signal (PLT) via proximity and pilot signal lines. The pilot signal line carries the pilot signal (PLT) described above in order to communicate available amperage for charging. The proximity signal line describes via the proximity signal (PRX) whether the charge coupler 16 is physically plugged into the offboard power supply. However, when wireless charging is initiated, a physical plug-in connection is not made. As a result, the proximity signal is not available via the charge coupler 16 in the usual manner.

In this situation, the control circuit 80 acts by emulating the proximity signal. That is, the pilot signal may be wirelessly intercepted by the ICM 31 as noted above, and thus the information is available to the control circuit 80 that a wireless charging station is present. The ICM 31 provides the necessary pilot signal and proximity signal to the controller 50 and other elements of the control circuit 80 as explained below. The controller 50 is unaware as to whether charging is conductive or inductive, but this lack of knowledge does not affect the charging performance due to the operation of the circuit 80.

In the alternative passive control circuit 80 shown schematically in FIG. 9, an ignition switch relay (RI) 82 of the vehicle 10 is activated when the vehicle 10 is turned off. The ignition switch relay 82, which may be optionally embodied as a single pole, double throw (SPDT) switch as shown, provides auxiliary (12 VDC) power from the battery 23 of FIG. 1 to a relay induction coil 83 of a normally-closed electromagnetic relay (Rw) 84. The electromagnetic relay 84, e.g., a double-pole, double throw (DPDT) switch as shown in FIG. 9 or a single-pole, single throw (SPDT) switch as shown in FIG. 10, remains closed during conductive charging as well as when driving the vehicle 10. When closed, the electromagnetic relay 84 thus causes the system to default to conductive charging. Energizing of the relay induction coil 83 opens the electromagnetic relay 84, which occurs only for and during wireless charging, and also serves to electrically disconnect the charge coupler 16 from the controller 50. The ICM 31 thereafter effectively functions in place of the charge coupler 16, which is now disconnected, by emulating and providing the proximity (PRX) and pilot (PLT) signals within the control circuit 80.

When the ignition switch 82 is turned off, a differentiator 81, e.g., an op-amp as shown, measures the proximity signal (PRX) on the proximity signal line on the output side of the electromagnetic relay 84. This information is fed into an AND logic gate 88 as shown, which then feeds a delay element (D) 87, e.g., a timer. A high/low voltage signal from the ignition switch relay 82 is also inverted and fed into the AND logic gate 88, such that the AND logic gate 88, and the delay element 87 downstream of the AND logic gate 88, do not output a high value unless (a) the proximity signal is detected by the differentiator 81 and (b) the ignition switch relay 82 outputs a low/0 VDC value, indicating that the vehicle 10 is not running. The output of the delay element 87 is fed into a semiconductor switch 90 such as the illustrated MOSFET, which includes a gate (G) provided to a PWM output circuit (PWM$_O$) 85.

When the ignition switch 82 has turned off, a differentiator 81, e.g., an op-amp as shown, measures the proximity signal (PRX) on the proximity signal on the output side of the electromagnetic relay 84. This information is fed into an AND logic gate 88 as shown, which then feeds the delay element (D) 87, e.g., a timer. The delay element (D) 87 will pass through a high level at its input, but only for a specified time period, after which the output of the delay element (D) 87 will be disabled to a low state. This allows the system to go to a low power mode if charging is not available or required.

A high/low voltage signal from the ignition switch relay 82 is also inverted and fed into the AND logic gate 88, such that the AND logic gate 88, and the delay element 87 downstream of the AND logic gate 88, do not output a high value unless (a) the proximity signal (PRX) is detected to be in a high state (i.e., charge coupler 16 is not plugged in) by the differentiator 81, and (b) the ignition switch relay 82 outputs a low/0 VDC value, i.e., the vehicle 10 is not running.

The output of the delay element 87 is fed into the semiconductor switch 90, such as the illustrated MOSFET, which includes the gate (G), with the gate (G) connected to the PWM output circuit (PWM$_O$) 85. This implementation results in the electromagnetic relay 84 opening up and the PWM output circuit 85 being enabled through the output of the OR gate 89 when the vehicle shuts down. If the PWM output circuit 85 is able to wirelessly charge the vehicle 10, the PWM output circuit 85 will assert the gate (G) prior to the time delay expiring, and will maintain the gate (G) drive to keep the electromagnetic relay 84 open until wireless charging is complete. When wireless charging is complete, the gate (G) drive is removed and the electromagnetic relay 84 is allowed to close.

As used herein, the PWM output circuit 85 may be embodied as a programmable PWM chip that is electrically connected to and receives a control PWM signal from the controller 50. The PWM output circuit 85 also receives the pilot signal (PLT) from the input and output sides of the electromagnetic relay 84 as shown, with power flowing in a nominal direction from the charge coupler 16 at the input side to the output side as is known in the art. Additionally, the PWM output circuit 85 receives the proximity signal (PRX) from only the output side of the electromagnetic relay 84. This feature allows the PWM output circuit 85 to recognize when the charge coupler 16, e.g., an AC receptacle, has been plugged into the offboard power supply of FIG. 1, with detection of a plug-in event, i.e., via detection of the pilot signals over the pilot signal line (PLT) from the input side of the electromagnetic relay 84, and shall stop wireless charging, stop simulating the proximity (PRX), stop simulating the pilot (PLT), and close the electromagnetic relay 84 by removing the gate (G) drive. Closing of the electromagnetic relay 84 in turn causes a default to conductive charging.

Also shown in the passive control circuit 80 of FIG. 9 is an OR logic gate 89, which receives a PWM signal from the controller 50 in addition to an output of the AND logic gate 88 to allow for chip-enable based on various vehicle modes to reduce 12 VDC parasitic losses. As noted above, the output of the AND logic gate 88 is high when the proximity signal (PRX) from the output side of the electromagnetic relay 84 is detected by the differentiator 81 and the ignition switch relay 82 outputs a low/0 VDC value, i.e., the vehicle 10 is off or not running. The PWM output circuit 85 is enabled under those conditions, or when the controller 50 so commands.

When enabled, the PWM output circuit 85 will determine if wireless charging is possible and if so will assert the gate (G) to open or maintain open relay 84 and will simulate the proximity (PRX) and Pilot (PLT) signals to communicate to controller 50 that wireless charging is available. If wireless charging is not available, then the gate (G) will not be asserted and the electromagnetic relay 84 will close after the time delay has expired, thus resulting in a default to conductive charging capability. The signal/line labeled "PWM" in FIG. 9 is a control PWM output from the controller 50 as an input to the PWM output circuit 85, which tells the PWM output circuit 85 the power level at which to operate the wireless charger 30. Outputs from the PWM output circuit 85 to the controller 50 are the proximity (PRX), pilot (PLT), and gate (G) signals. Functionally, the PWM output circuit 85 mimics the J1772 proximity (PRX) signal by inserting an appropriate impedance value. In addition, the PWM output circuit 85 sends out the pilot signal (PLT), which itself is a PWM signal, to signal the controller 50 as to the available charging amperage, as noted above.

Thus, the control circuit 80 allows the controller 50 to operate as if the vehicle 10 is conductively charging the battery pack 21 when, in fact, the charging operation is actually wireless. The control circuit 80 also allows the charging operation to default to conductive charging as soon as the charge coupler 16 is plugged into the offboard power supply 12. As will be appreciated by those of ordinary skill in the art, such an approach may be advantageous relative to conventional after-market systems which lack knowledge of the electrical system 20 of the vehicle 10, and which connect to the charge coupler 16 on the AC-side of the electrical system 20, thereby losing efficiency. As with the embodiments described with reference to FIGS. 1-8, the embodiment of FIG. 9 does not relay on CAN messaging or knowledge thereof, operating instead via low-voltage analog signals and is able to couple the wireless system to the HVDC bus 17 directly.

Other embodiments may be envisioned within the scope of the disclosure. For instance, rather than switching the pilot signal (PLT) and proximity signal (PRX) together, the relay 84 may be alternatively configured to switch the pilot (PLT) only. Thus, rather than a DPDT switch as the relay 84 as shown in FIG. 9, the circuit 80 may use an electromagnetic relay 184 in the form of a single-pole, single-throw (SPST) switch as shown in FIG. 10. The electromagnetic relay 184 in this alternative configuration switches the pilot signal (PLT) only. That is, the electromagnetic relay 184 is selectively opened to discontinue transmission of the pilot signal (PLT) between the charge coupler 16 and the controller 50, with the pilot signal (PLT) describing the available charging amperage as noted elsewhere above. When the charge coupler 16 is plugged in and the proximity signal (PRX) is sensed, the information conveyed by the proximity signal (PRX) is made continuously available to the PWM output circuit 85 and the controller 50. Control of the alternative relay 184 is used to switch on and off any communication of the sensed pilot signal (PLT) to the PWM chip 85 and the controller 50.

While the best modes for carrying out the disclosure have been described in detail, those familiar with the art to which this disclosure relates will recognize various alternative designs and embodiments that fall within the scope of the appended claims.

The invention claimed is:

1. An electrical system for a vehicle having a park, reverse, neutral, drive, low (PRNDL) state, the electrical system being connectable to an offboard power supply, the electrical system comprising:
   a direct current (DC) voltage bus;
   a battery pack connected to the DC voltage bus;
   a DC-coupled conductive charging system operable for conductively charging the battery pack via the offboard power supply;
   a DC-coupled wireless charger in electrical parallel with the DC-coupled conductive charging system and operable for wirelessly charging the battery pack via the offboard power supply; and
   a controller programmed to selectively initiate charging of the battery pack according to a charging preference using analog low-voltage control signals, wherein the charging preference prioritizes charging of the battery pack via a designated one of the DC-coupled conductive and wireless charging systems, to temporarily immobilize the vehicle when the PRNDL state is a park state and wireless or conductive charging is active, and to:
      selectively transmit a pulse width modulation (PWM) signal to the wireless charger to wake up or enable the wireless charger after the vehicle enters the park state; and
      discontinue transmitting the PWM signal to the wireless charger when a wireless charging circuit is not detected within a calibrated duration of a key-off event upon entering the park state.

2. The electrical system of claim 1, wherein the controller includes a human-machine interface device programmed to display a plurality of charging preferences, and for receiving an input as the charging preference that corresponds to a selected one of the displayed plurality of charging preferences.

3. The electrical system of claim 1, further comprising an AC-DC converter wherein the AC-DC converter and the wireless charger share a high-voltage bus rail and pre-charge circuit.

4. The electrical system of claim 1, wherein the controller is programmed to discontinue the PWM signals to the wireless charger in response to an application of brakes of the vehicle and an attempt to change the PRNDL state from the park state to a drive state or a reverse state.

5. The electrical system of claim 1, wherein the controller is programmed to initiate conductive charging of the battery pack upon detecting a plug-in event while wirelessly charging the battery pack only when the charging preference corresponds to conductive charging.

6. An electrical system that is connectable to an offboard power supply, the electrical system being part of a vehicle having an ignition switch relay, the electrical system comprising:
   a direct current (DC) voltage bus;
   a battery pack connected to the DC voltage bus;
   a charge coupler connectable to the offboard power supply to establish a plug-in charging connection;
   a normally-closed electromagnetic relay electrically connected to the charge coupler and having a relay induction coil, wherein the ignition switch, when the vehicle is turned off, delivers auxiliary power to the relay induction coil to cause the normally-closed electromagnetic relay to open;
   a DC-coupled conductive charging system electrically connected to the charge coupler and operable for conductively charging the battery pack via the plug-in charging connection;
   a DC-coupled wireless charger in electrical parallel with the DC-coupled conductive charging system and operable for wirelessly charging the battery pack via the offboard power supply and an offboard primary induction coil when the electrical system is in proximity to an offboard primary induction coil; and
   a controller programmed to selectively initiate charging of the battery pack using analog low-voltage control signals, wherein the controller is programmed to charge the battery pack via the DC-coupled conductive charging system when the charge coupler is plugged into the offboard power supply, and via the wireless charger when the charge coupler is not plugged into the offboard power supply and the controller detects the proximity of the system to the primary induction coil.

7. The electrical system of claim 6, wherein the electromagnetic relay is a single pole, single-throw (SPST) switch that, when closed, causes the system to default to conductive charging and that opens only during wireless charging.

8. The electrical system of claim 7, wherein the SPST switch is selectively opened to discontinue transmission of a pilot signal between the charge coupler and the controller, and wherein the pilot signal describes an available charging amperage.

9. The electrical system of claim 7, wherein the electromagnetic relay is a double-pole, double-throw (DPDT)

switch that, when closed, causes the system to default to conductive charging and that opens only during wireless charging.

10. The electrical system of claim 9, wherein the DPDT switch is selectively opened to discontinue transmission of the pilot signal and a proximity signal from the charge coupler to the controller, and wherein the proximity signal describes a detected presence of a primary induction coil for wireless charging of the battery pack.

11. The electrical system of claim 7, wherein the wireless charger includes a control chip in the form of a inductive charging module that, when the charge coupler is not plugged in to the AC power supply, provides a proximity signal indicative of the proximity to the offboard primary induction circuit and a pilot signal describing an available amperage for wireless charging.

12. The electrical system of claim 11, further comprising a differentiator and an AND logic gate, wherein the differentiator measures the proximity signal at an output side of the electromagnetic relay and feeds the proximity signal into the AND logic gate, and wherein a high/low voltage signal from the ignition switch relay is inverted and fed into the AND logic gate such that the AND logic gate does not output a high value unless the proximity signal is detected by the differentiator and the ignition switch relay outputs a low/0 VDC value.

13. The electrical system of claim 12, further comprising a semiconductor switch connected to a programmable pulse width modulation (PWM) chip, wherein the output of the AND logic gate is time-delayed and fed into the semiconductor switch, and wherein the PWM chip receives the pilot signal from an input side and an output side of the electromagnetic relay, and receives the proximity signal only from the output side of the electromagnetic relay.

14. An electrical system for a vehicle having a park, reverse, neutral, drive, low (PRNDL) state, the electrical system being connectable to an offboard power supply, the electrical system comprising:
   a direct current (DC) voltage bus;
   a battery pack connected to the DC voltage bus;
   a DC-coupled conductive charging system operable for conductively charging the battery pack via the offboard power supply;
   a DC-coupled wireless charger in electrical parallel with the conductive charging system and operable for wirelessly charging the battery pack via the offboard power supply; and
   a controller programmed to selectively initiate charging of the battery pack according to a charging preference using analog low-voltage control signals, wherein the charging preference prioritizes charging of the battery pack via a designated one of the conductive charging system and wireless charging system, to temporarily immobilize the vehicle when the PRNDL state is a park state and wireless or conductive charging is active, and to:
      selectively transmit a pulse width modulation (PWM) signal to the wireless charger to wake up or enable the wireless charger after the vehicle enters the park state; and
      discontinue the PWM signals to the wireless charger in response to an application of brakes of the vehicle and a change of the PRNDL state from the park state to a drive state or a reverse state.

* * * * *